US007232554B2

United States Patent
Videla et al.

(10) Patent No.: US 7,232,554 B2
(45) Date of Patent: Jun. 19, 2007

(54) PROCESS FOR RECOVERING ARSENIC FROM ACIDIC AQUEOUS SOLUTION

(75) Inventors: Jose Mendoza Videla, La Serena (CL); Jorge Balanda Andina, Le Serena (CL); Hector Gallegos Cisternas, Santiago (CL)

(73) Assignee: Barrick Gold Corporation, Toronto, Ontario (CA)

( * ) Notice: Subject to any disclaimer, the term of this patent is extended or adjusted under 35 U.S.C. 154(b) by 660 days.

(21) Appl. No.: 10/381,566

(22) PCT Filed: Dec. 14, 2001

(86) PCT No.: PCT/IB01/02494

§ 371 (c)(1),
(2), (4) Date: Mar. 25, 2003

(87) PCT Pub. No.: WO02/48046

PCT Pub. Date: Jun. 20, 2002

(65) Prior Publication Data

US 2004/0007536 A1    Jan. 15, 2004

(30) Foreign Application Priority Data

Dec. 14, 2000   (CL)   ................... 3449 2000
Nov. 20, 2001   (CL)   ..................... 2814 01

(51) Int. Cl.
*C01G 28/00*   (2006.01)
(52) U.S. Cl. ............ 423/87; 423/88; 423/531; 423/617; 210/912; 210/710; 210/737
(58) Field of Classification Search .......... 423/87, 423/88, 531, 617; 210/912, 710, 737
See application file for complete search history.

(56) References Cited

U.S. PATENT DOCUMENTS

| 1,921,706 A | * | 8/1933 | Schopper .................. 423/87 |
| 4,138,231 A | | 2/1979 | Hedenas et al. |
| 4,218,425 A | | 8/1980 | Charlton et al. |
| 4,244,927 A | | 1/1981 | Reynolds et al. |
| 4,401,632 A | | 8/1983 | Madsen et al. |
| 4,566,975 A | | 1/1986 | Allgulin |
| 4,588,564 A | | 5/1986 | Kohno et al. |
| 5,137,640 A | | 8/1992 | Poncha |
| 5,338,460 A | | 8/1994 | Yen |

FOREIGN PATENT DOCUMENTS

| DE | 594 550 C | | 3/1934 |
| DE | 598 669 C | | 6/1934 |
| DE | 1 028 548 B | | 4/1958 |
| JP | 5-97439 | * | 4/1993 |
| JP | 6-171946 | * | 6/1994 |

OTHER PUBLICATIONS

Translation of DE 594550, Mar. 1934.*
Translation of DE 598669, Jun. 1934.*
Translation of DE 1028548, Apr. 1958.*
Tomita, T., New Sumitomo Process and Operation for Recovering Arsenic Trioxide from Arsenic Residue, *Journal of Metals*, 1983, p. 10, vol. 35, No. 12, Metallurgical Society of AIME, New York.
Chen, Wei-ping, et al., Application of Wet-Method for Extracting Arsenic in Treating Industrial Wastewater and Residues, *China Environmental Science*, 1999, pp. 310-312, vol. 19, No. 4.
International Search Report, PCT/IB01/02494, from the European Patent Office dated Aug. 9, 2002.
Torikai, E., et al., "Apparatus For Purifying Arsenic Trioxide", Chemical Abstracts, Aug. 23, 1993, Abstract No. 119: 75769s, American Chemical Society, Columbus, Ohio.
Holleman, A.F., et al., "Lehrbuch der Anorganischen Chemi", 1995, pp. 804-805, Berlin, New York.
Janger, G., et al., "Lehrbuch der Analytischen und Praparativen Anorganischen Chemi", 1979, pp. 376-377.

* cited by examiner

*Primary Examiner*—Steven Bos
(74) *Attorney, Agent, or Firm*—Senniger Powers

(57) ABSTRACT

A process for the recovery of arsenic trioxide from acid solutions, particularly the aqueous acid effluent produced by a gas-washing process in the pyrometallurgy of copper sulfide ores is provided. Generally, the process comprises concentrating the acid solution in one or more evaporators in series; crystallizing arsenic contained in the concentrated solution as arsenic trioxide crystals; filtering the crystallized solution to obtain a solid phase comprising impure arsenic trioxide crystals; and purifying the solid phase to obtain a purified crystal product comprising arsenic trioxide. The process produces a commercially salable arsenic trioxide product without producing any solid or liquid residues subject to special handling or treatment regulations.

12 Claims, 3 Drawing Sheets

PROCESS FOR RECOVERING ARSENIC FROM ACIDIC AQUEOUS SOLUTION

FIELD OF THE INVENTION

The present invention relates, in general, to the recovery of arsenic containing residues from acidic aqueous solution, and, more particularly, to the recovery of arsenic values from acidic gas wash solutions, for example, acidic gas wash solutions produced in the pyrometallurgy of copper sulfide ores.

BACKGROUND OF THE INVENTION

In a typical metallurgical process for the recovery of copper, arsenic present in the copper ore often remains in the refined products and/or in the process wastewater. Such arsenic-containing residues present significant cost and operational challenges to the copper recovery process as the residues must be treated or disposed of as hazardous materials to avoid negatively impacting the environment. Therefore, plants and/or refineries producing copper concentrates and products containing more than 5% arsenic must generally pre-treat these concentrates to remove arsenic.

A conventional process for pre-treating an arsenic-containing copper concentrate or product comprises heating the concentrate or product under reducing conditions to volatilize the arsenic as a sulfide. The arsenic sulfide is then combusted with air to produce arsenic trioxide and sulphur dioxide as follows:

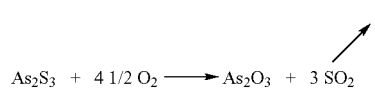

$$As_2S_3 + 4\,1/2\,O_2 \longrightarrow As_2O_3 + 3\,SO_2$$

The resulting calcinated material typically has an arsenic content ranging within commercial standards.

In an alternative process, arsenic-containing copper concentrates are smelted and reduced in converters or flash-type ovens to volatilize arsenic and produce an arsenic-containing off-gas. The arsenic-containing off-gas is further treated in a gas washing plant to recover the arsenic. The arsenic-containing off-gas is contacted with an acid to generate an effluent in the form of an acid solution. Conventionally, the acidic gas wash effluent is then neutralized with lime, filtered and dried to produce a calcium arsenate sludge. However, the handling and disposal of such arsenic-containing sludge are still governed by stringent environmental regulations. Therefore, a need exists for a more cost effective process wherein arsenic can be recovered from an acidic aqueous solution and reused as a salable commercial product while minimizing the risk of direct and indirect environmental pollution.

Many prior art processes are known for treating and/or recovering arsenic from wastewater and other sources. For example, in U.S. Pat. No. 4,138,231, Hedenas et al. describe a procedure for wet-cleaning gases containing sulfur dioxide, arsenic and halogens produced in the pyrometallurgy of sulfidic materials. The gases are washed with diluted sulfuric acid in a closed loop and arsenic is recovered as an arsenic trioxide product by precipitating arsenic trioxide with sulfides or by alkalinizing the solution. However, the process requires that the washing liquid be pregnated with at least 50 g/L of solid arsenic trioxide in order to promote arsenic recovery from the roaster gas.

Kohno et al., in U.S. Pat. No. 4,588,564, describe a process for removing arsenic from the exhaust gas of a sulfide ore smelter. The process discloses scrubbing the exhaust gas with water at a predetermined concentration and temperature to provide an effluent solution having an arsenic concentration of at least 80% of its saturation concentration. The solution is then filtered and arsenic trioxide is crystallized under vacuum or by cooling at a pH less than 2. Finally, the arsenic trioxide crystals are contacted with hydrochloric acid to produce an arsenic trioxide product.

Tomita, et al., in *J. Metal*, Vol. 35, No. 12 (1983), describe a process for recovering arsenic trioxide from copper cement. The process requires the steps of leaching copper cement to form $CuSO_4$ in acid solution; dissolving arsenious sulfide in the $CuSO_4$ solution; oxidizing As(III) to As(V); reducing As(V) to an $As_2O_3$ crystal with $SO_2$ gas; and drying the arsenic trioxide crystals.

Madsen et al., in U.S. Pat. No. 4,401,632, describe treating gases from smelter flue dusts by forming an aqueous slurry of the dust, treating the slurry with sulfur dioxide gas to solubilize arsenic and precipitating arsenic as an arsenic trioxide product by means of sulfuric acid.

Yen, in U.S. Pat. No. 5,338,460, describes the removal of dissolved heavy metals, including arsenic, from aqueous solutions, particularly industrial and mining waters. The procedure discloses reacting the dissolved heavy metal with an inorganic sulfide or hydrosulfide at high temperature between 0° and 100° C. and controlling the pH between 2 and 3.5.

Allgulin, in U.S. Pat. No. 4,566,975, describes treating aqueous solutions containing impure heavy metals such as arsenic, phosphorus and mercury. The reference describes precipitating impure heavy metals from solution in two stages, using sodium hydroxide and ferric sulfate as precipitating agents. Arsenic impurities are then recovered as a sludge of iron-arsenic oxide, which can be stabilized and disposed.

Reynolds et al., in U.S. Pat. No. 4,244,977, describe the recovery of arsenic from ferric arsenate produced in the processing of materials containing high arsenic values, such as smelting powders. The procedure requires treating ferric arsenate compounds with sodium hydroxide, extracting pentavalent arsenic in a sodium arsenate solution and recovering an arsenic product.

Chen, et al., in *Env. Sci. of China*, 19(4):310–12 (1999) describe the removal of arsenic sulphuret from acidic metallurgical wastewater. The sulphuret is treated with acid to recover arsenic trioxide with a purity of 99.4%, along with a sulphur by-product.

Therefore a need continues to exist for recovering arsenic from aqueous acid solutions wherein a commercial arsenic trioxide product can be obtained, together with other by-products, which can be used directly in other processes and wherein the process does not produce any liquid or solid residues requiring special handling or disposal.

SUMMARY OF THE INVENTION

Among the several objects of the present invention, therefore, is the provision of a process for the recovery of arsenic from an acidic aqueous solution; the provision of such a process for recovering arsenic from the gas wash effluents of a copper sulfide smelting plant; the provision of such a process wherein useful products such as commercially salable arsenic trioxide are recovered; and the provision of such a process wherein hazardous residues can be recovered for reuse thereby minimizing their potentially negative effects on the environment.

Briefly, therefore, the present invention is directed to a process for recovering arsenic from an aqueous acid solution. The process comprises heating the acid solution in one or more evaporators in series to concentrate the solution. The concentrated solution is then cooled to crystallize arsenic as arsenic trioxide. The crystallized solution is filtered to produce a solid phase comprising impure arsenic trioxide crystals, which are purified to produce a purified crystal product comprising arsenic trioxide.

The present invention is further directed to a process for recovering arsenic from an aqueous acid solution. The process comprises concentrating the acid solution in one or more evaporators in series to produce a concentrated acid solution. The concentrated acid solution is cooled to crystallize arsenic as arsenic trioxide and the crystallized solution is filtered to produce a solid phase of impure arsenic trioxide crystals and a residual liquid phase. The solid phase of impure crystals is purified to produce a purified crystal product comprising arsenic trioxide while the residual liquid phase is contacted with sodium sulfide for the further recovery of arsenic. Arsenic is precipitated in the residual liquid phase as an arsenic sulfide and the precipitated residual liquid phase is filtered to produce an arsenic sulfide product and a purified liquid phase containing less than about 5 ppm arsenic.

Still further, the present invention is directed to a process for continuously processing effluents of an aqueous acid solution containing arsenic. The process comprises filtering the acid solution to eliminate suspended solids before evaporating and concentrating the solution in a chain of evaporators in series at low pressure to produce a concentrated acid solution. Arsenic in the concentrated acid solution is crystallized as arsenic trioxide by cooling and the crystallized solution is filtered to produce a solid phase comprising impure arsenic trioxide crystals and a residual liquid phase. The solid phase is purified by sublimating arsenic trioxide from the solid phase, thereby producing a purified gaseous phase and a solid sublimation residue. The purified gaseous phase is immediately cooled to produce a purified crystal product comprising arsenic trioxide while the residual liquid phase is processed for the further recovery of arsenic. The residual liquid phase is contacted with sodium sulfide to produce an arsenic sulfide precipitate, which is filtered from the residual liquid phase to produce a solid phase comprising arsenic sulfide and a purified liquid phase comprising a weak sulfuric acid containing less than 5 ppm arsenic.

In an alternative embodiment, the solid phase comprising impure arsenic trioxide crystals is purified by lixiviation. The process comprises contacting the solid phase comprising impure arsenic trioxide crystals with sodium hydroxide to lixiviate arsenic trioxide and produce a purified liquid phase comprising arsenic trioxide and a solid phase comprising a lixiviation solid residue. The purified liquid phase is separated from the lixiviation solid residue and contacted with an acid, thus lowering the pH to less than 10 and crystallizing arsenic trioxide. The crystallized liquid phase is then filtered to produce a purified crystal product comprising arsenic trioxide.

Other objects and features of the present invention will be in part apparent and in part pointed out hereinafter.

DETAILED DESCRIPTION OF THE INVENTION

In accordance with the present invention, it has been found that substantially pure, commercial-grade arsenic can be recovered from acidic aqueous solution, particularly a solution such as the acidic effluent of a gas washing operation. For example, in a preferred embodiment, the present invention comprises a process for recovering arsenic, in the form of a commercially salable arsenic trioxide product, from an acidic gas wash effluent produced in the pyrometallurgy of copper sulfide ores.

Generally, the present invention is suitable for use in recovering arsenic from any acidic aqueous solution containing from about 1 to about 20 g/L of arsenic and from about 25 to about 150 g/L of acid. The solution may also contain a wide variety of other impurities, for example, metals and/or halogens, without adverse effect on the process of the present invention. In a preferred embodiment, the raw material acid solution for the process of the present invention comprises the effluent from a gas wash tower operated in the conventional pyrometallurgy of copper sulfide. The effluent generally comprises from about 1 to about 20 g/L total arsenic, from about 25 to about 150 g/L sulfuric acid, from about 300 to about 3,000 mg/L copper, from about 100 to about 1,000 mg/L fluorine, and from about 100 to about 3,000 mg/L chlorides. Further, it is important to note that if the arsenic-containing feed solution contains suspended solids, it is preferably filtered to produce a solution suitable for evaporization.

Figure 1:
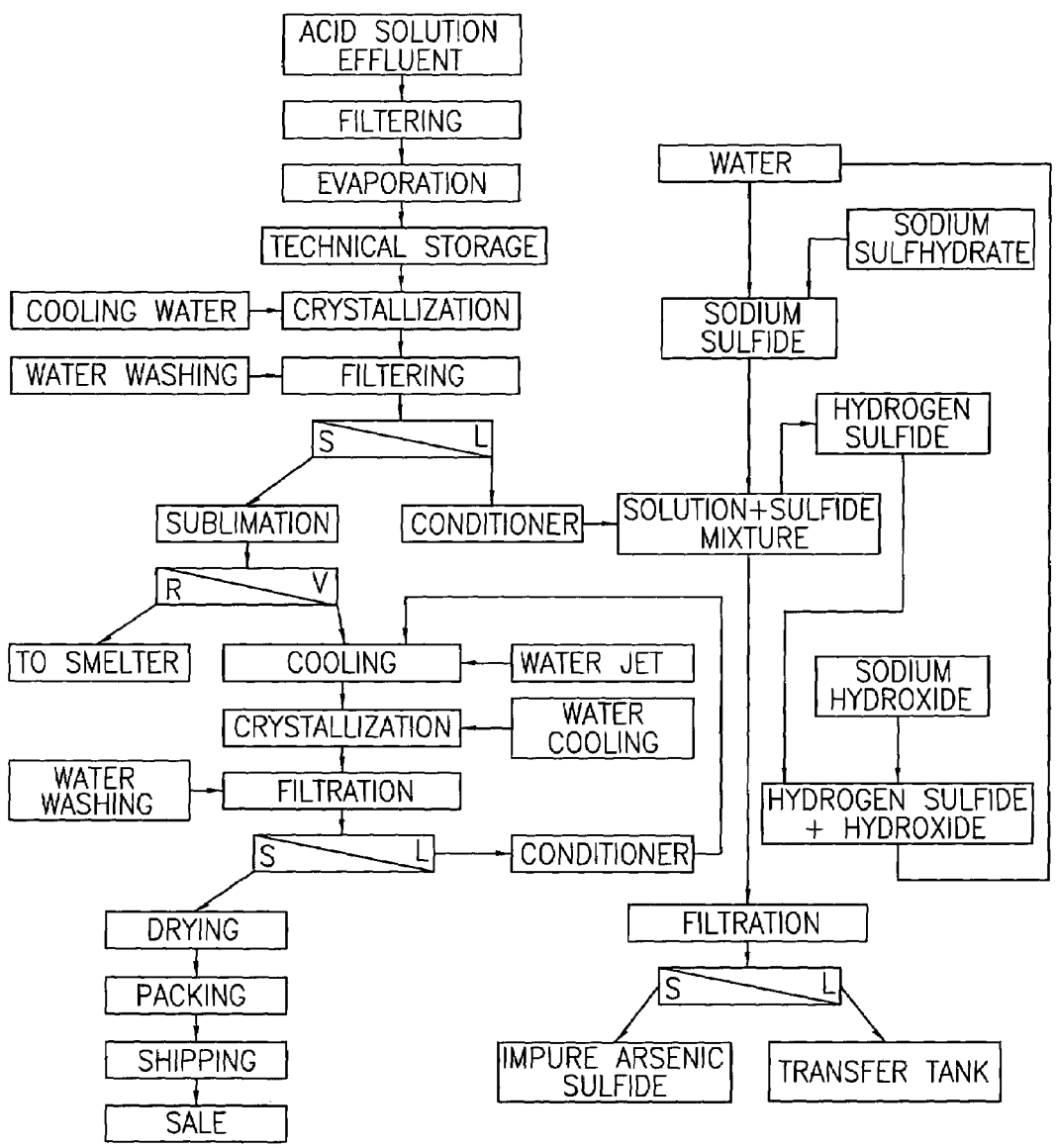
FIG. 1 is a block flow diagram illustrating one embodiment of the present invention.

Referring now to FIG. 1, after filtering the arsenic-containing feed solution (if necessary), the process of the present invention generally comprises heating the solution to evaporate water and concentrate arsenic. Preferably, the arsenic concentration of the acid solution is increased to an equilibrium concentration (i.e., saturation concentration) by heating the solution in one or more evaporators in series. Depending on the relative arsenic and acid concentrations in the feed solution, one skilled in the art can readily determine an appropriate saturation or equilibrium concentration for arsenic at a particular temperature. It is important to note that the saturation concentration should be determined at the temperature of crystallization rather than the solution temperature during evaporation. Thus, in a preferred embodiment of the process of the present invention, wherein the acid concentration of the solution leaving the evaporators is to be cooled at a temperature ranging from about 100° to about 25° C., the saturation concentration (i.e., the minimum concentration for crystallization) of arsenic is between about 5 and about 20 g/L in a solution containing from about 200 to about 640 g/L of acid.

Figure 2:
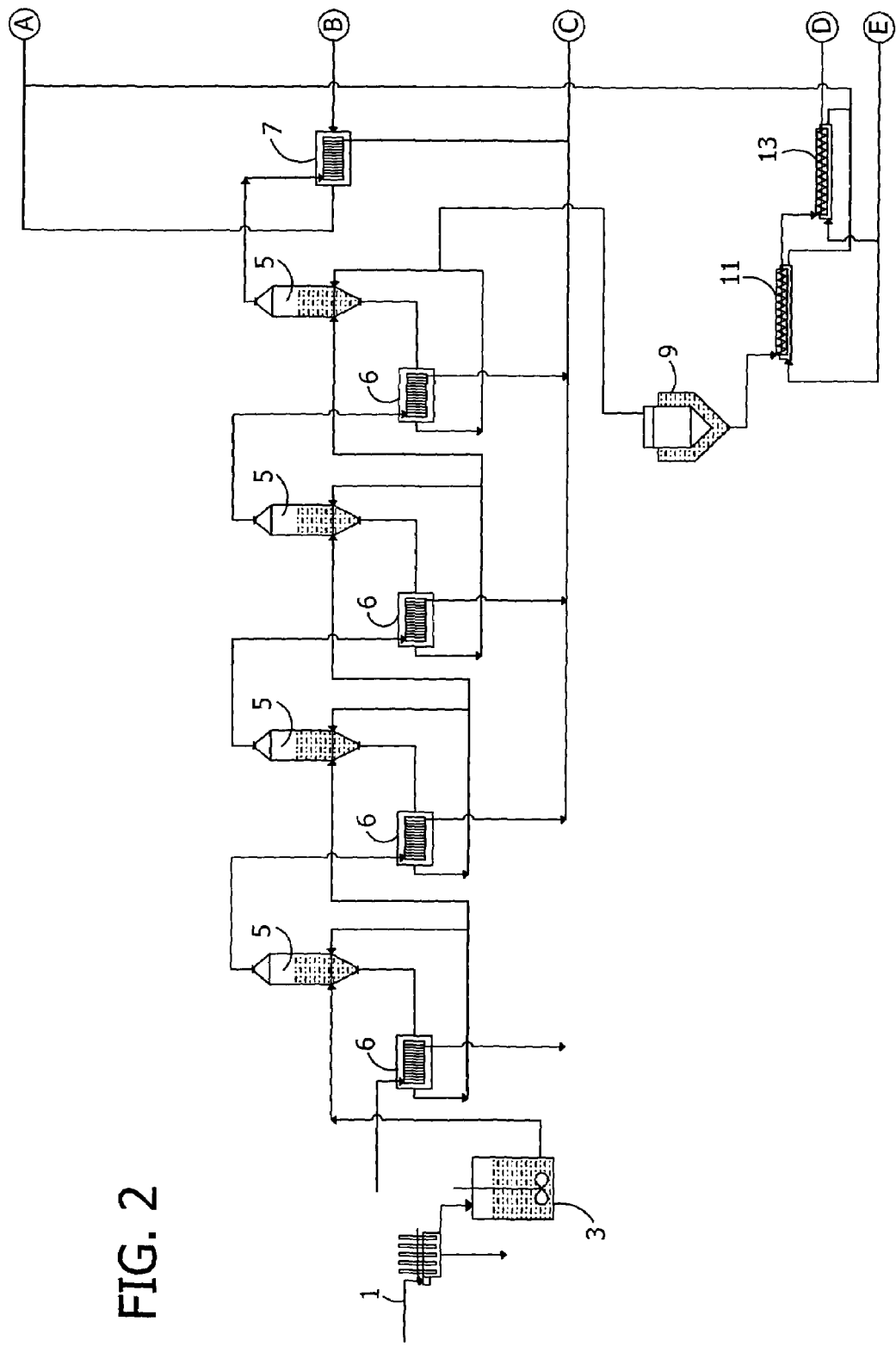
FIG. 2 is a process flow diagram illustrating a preferred embodiment of the present invention.
Figure 2A:
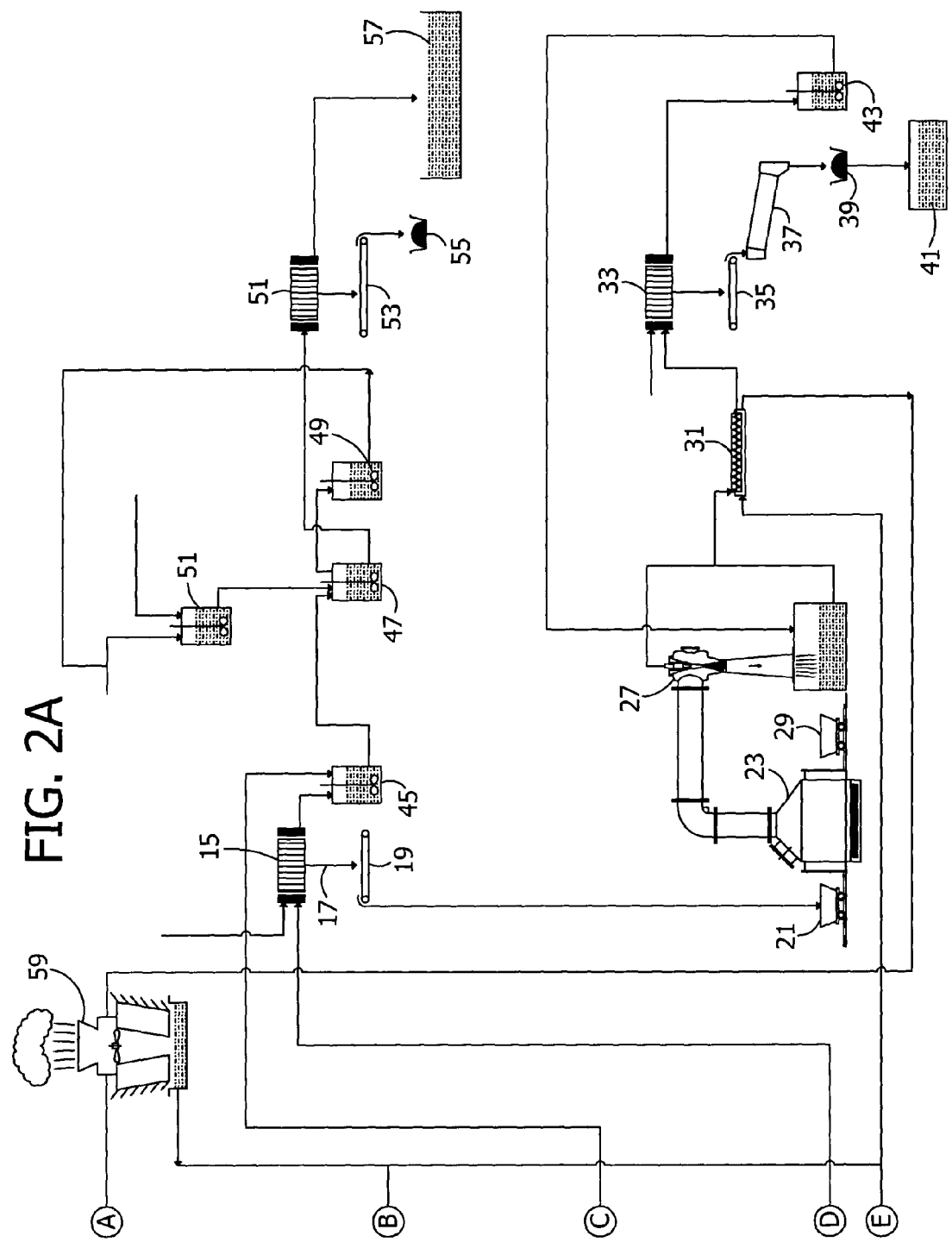
FIG. 2A is a continuation of the process flow diagram of FIG. 2 illustrating a preferred embodiment of the present invention.

The solution is evaporated and concentrated in one or more evaporators in series operating at a temperature ranging from about 70° C. to about 120° C. For example, in a preferred embodiment of the present invention as shown in FIGS. 2 and 2A, the process of the present invention comprises four evaporators in series, wherein the acid solution feed stream originally containing from about 20 to about 150 g/L of arsenic-containing acid is evaporated and concentrated to an acid concentration of from about 200 to about 640 g/L.

The concentrated liquid mass exiting the last evaporator typically will have a temperature ranging from about 50° to about 70° C., preferably about 60° C. The concentrated solution may be transferred to a thermally insulated storage tank to preserve the temperature of the solution prior to crystallization. Alternatively, the concentrated solution may pass directly to a crystallization stage wherein the concentrated solution is cooled to a temperature of from about 0° to about 25° C., more preferably from about 10° to about 20° C. to crystallize arsenic in the form of arsenic trioxide crystals.

In a preferred embodiment, the concentrated solution is cooled in one or more crystallizers in series. Preferably, the crystallizers are water-cooled wherein the concentrated solution is contacted with water having a temperature of from about 0° to about 25° C. The concentrated solution is cooled to produce a crude arsenic trioxide product comprising impure arsenic trioxide. For example, in a preferred embodiment wherein the aqueous acid solution comprises a gas wash effluent produced in the pyrometallurgy of copper sulfide ores, the impure arsenic trioxide crystals typically contain impurities such as Cu, Fe, Ni, and Ca salts. The crystallizer(s) preferably recover at least about 90%, more preferably at least about 95% of the arsenic present in the acidic feed solution. From the crystallizers, the crude arsenic trioxide product is washed and separated in a water-washed filter wherein the crystals are collected for further purification and the remaining liquids are further processed for the removal of any remaining trace amounts of arsenic.

The collected crude arsenic product is purified to obtain a substantially pure, commercially salable arsenic trioxide product comprising at least about 97% arsenic trioxide, preferably at least about 98% arsenic trioxide, and more preferably at least about 99% arsenic trioxide, most preferably from about 99.8% to 99.9% arsenic trioxide.

In a first embodiment for purifying the crude arsenic trioxide product, the impure arsenic trioxide crystals are transferred to a sublimation oven wherein the crystals are heated to a temperature sufficient to sublime arsenic trioxide. Arsenic trioxide sublimes from the crude arsenic trioxide solid product to form a purified gaseous product comprising arsenic trioxide and a sublimation solid residue. Preferably, the temperature is sufficient to sublime arsenic trioxide from the impure arsenic trioxide crystals without removing a substantial amount of the metal salt impurities to the purified gaseous phase. The purified gas phase is removed from the sublimation oven and immediately cooled to form a purified solid product comprising arsenic trioxide crystals having an arsenic trioxide concentration of at least about 99%, more preferably about 99.8 to about 99.9%. The sublimation solid residue, which typically contains copper sulfides and calcium sulfate, is removed from the sublimation oven and returned to the smelting plant for the further recovery of copper.

The purified gaseous product may be cooled by any means known in the art for forming arsenic trioxide crystals from a vapor. For example, in a preferred embodiment, the arsenic-containing vapor is contacted with water jets to cool the vapor and produce purified arsenic trioxide crystals. Alternatively, the arsenic-containing vapor is contacted with a cold wall wherein the vapor is cooled to form the purified arsenic trioxide solid product.

In an alternative embodiment for purifying the crude arsenic trioxide product, the impure arsenic trioxide crystals undergo alkaline lixiviation to remove impurities. The lixiviation process comprises contacting the impure crystals with an alkaline lixiviant such as an alkaline metal hydroxide to remove arsenic trioxide as a purified liquid phase from the crystals. The lixiviant is preferably selected to avoid transferring impurities to the liquid phase (i.e., substantially no impurities are lixiviated to the purified liquid phase). The purified liquid phase is then separated from the solids and the solid residue is returned to the smelting plant for further recovery of copper. The purified liquid phase is contacted with an acid to adjust the pH to less than 10, which also crystallizes arsenic trioxide. In a preferred embodiment, the purified liquid is crystallized with sulfuric acid, preferably a solution comprising 98% sulfuric acid, to produce a purified arsenic trioxide product comprising at least about 99% arsenic trioxide, and more preferably about 99.8 to about 99.9% arsenic trioxide. The purified arsenic trioxide product can then be collected by means of a filter with the liquid phase being recycled to the lixiviation stage.

In another embodiment of the present invention, liquids separated from the crude arsenic trioxide product, which typically contain from about 5 to about 7 g/L arsenic, can be further processed to remove arsenic and/or prepare additional recoverable products. For example, in one embodiment, the filtrate from the crystallization of the crude arsenic trioxide product is collected in a storage tank along with the condensed liquids from the upper part of the evaporator(s) to form a residual arsenic solution. The residual arsenic solution is then contacted with sodium sulfide to produce an arsenic polysulfide product (e.g., arsenic trisulfide) which can be recovered from solution as a precipitate. The reactions corresponding to the generation and precipitation of arsenic polysulphides are as follows:

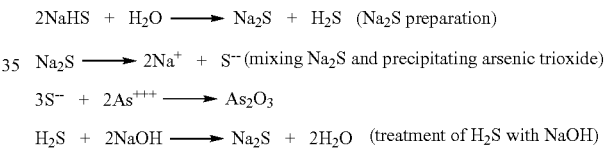

Generally, sodium sulfide should be introduced to the residual solution in an amount sufficient to provide a mass ratio of sodium sulfide to arsenic of about 1:4 to about 1:8 in the residual solution. Preferably, an amount of sodium sulfide is introduced into the residual solution to provide a mass ratio of sodium sulfide to arsenic of about 1:6 in order to precipitate arsenic polysulfides from the residual arsenic solution. The predominant arsenic polysulfide species formed is arsenic trisulfide along with iron and copper sulfide byproducts. The precipitated arsenic polysulfides are recovered by filtration and the remaining liquid, having an arsenic content of less than about 5 ppm, can be transferred to a storage tank for reuse or disposal.

Referring now to FIGS. 2 and 2A, a preferred apparatus for practicing the process of the present invention is described as follows. A feed stream comprising an aqueous arsenic-containing acid solution is introduced into the process of the present invention via pipe 1. In a preferred embodiment wherein the feed stream comprises the acidic effluent of a gas wash tower, the solution is first filtered in a dust filter 2. The filtered feed stream is transferred to tank 3 before being sent to a first evaporator 5. In a preferred embodiment, the evaporator 5 comprises a forced circulation type evaporator with a separate, external heat exchanger 6. As shown in FIG. 2, a preferred apparatus of the invention comprises four evaporators in series each with a corresponding heat exchanger for concentrating the feed solution.

In the evaporation stages, the solution, at a temperature of about 60° C. and having an acid concentration of up to about 640 g/L, shows incipient formation of arsenic trioxide crystals. The concentrated solution is then transferred to a storage tank 9, which is thermally insulated to preserve the temperature of the solution and prevent premature crystallization of arsenic trioxide. From tank 9, the concentrated solution is cooled in a first crystallizer 11 followed by a second crystallizer 13, both of which are cooled with water to form a crude arsenic trioxide product.

The mass of crystals exiting from crystallizer 13 as the crude arsenic trioxide product is transferred to filter 15, and washed with water. The impure arsenic trioxide crystals then fall via conduit 17 to a conveyor belt 19, and through a channel to dump carts 21. The loaded dump carts 21 go to a sublimation oven 23. In the sublimation oven, the crude arsenic trioxide product is heated to volatilize arsenic trioxide and form a purified gaseous product. The purified gaseous product passes from the sublimation oven to a Venturi-type condenser 27, wherein the purified gaseous product is cooled by means of a pressurized water jet to produce a solution pregnant with purified arsenic trioxide crystals, which is then further cooled in crystallizer 31. When the sublimation of arsenic is completed, the dump carts 29 exiting the oven typically contain by-products such as copper sulfate and calcium sulfate, which are returned to the smelting plant for further processing.

The solution pregnant with pure arsenic trioxide crystals is driven to filter 33 and washed with water to separate a substantially pure arsenic trioxide product having an arsenic trioxide concentration of about 99.8% to about 99.9%. Conveyor belt 35 carries the purified product to drying oven 37, and then to storage 39 and packing facility 41, for sale and shipping.

Filtrate separated from the crude arsenic trioxide product at filter 15, is collected in a storage tank 45 along with the collected condensed vapors from the upper part of the evaporators 5 to form a residual arsenic solution. The residual arsenic solution is then passed to the arsenic sulfide precipitation plant for the further recovery of arsenic. From the storage tank 45, the residual arsenic solution is transferred to mixing tank 47 and contacted with sodium sulfide from reaction tank 51. The sodium sulfide prepared in reaction tank 51 is the reaction product of sodium sulfhydrate and water. The reaction in mixing tank 47 forms a reaction mixture comprising arsenic polysulfide precipitates and hydrogen sulfide gas as a byproduct. The byproduct hydrogen sulfide gas is passed to a treatment tank 49 and contacted with sodium hydroxide to form water which may be recycled for use as a water source in reaction tank 51. The remaining reaction mixture is transferred to filter 51 wherein an arsenic polysulfide solid product comprising arsenic trisulfide is collected on conveyor belt 53 for storage in hopper 55. The remaining process liquids separated in filter 51, which contain less than about 1 to about 5 ppm of arsenic, are transferred to holding tank 57 for further use or disposal.

EXAMPLES

The following examples set forth one approach that may be used to carry out the process of the present invention. Accordingly, the following should not be interpreted in a limiting sense.

Example 1

This example demonstrates the evaporation and concentration of an arsenic solution followed by crystallization and filtration to recover commercial grade arsenic. The experiment was begun by heating a solution (2000 cc) containing copper (0.63 g/L), iron (0.107 g/L), arsenic (9.406 g/L) and antimony (0.036). The solution was heated to reduce the volume to 250 cc. During the heating, samples of the solution were collected when the volume was reduced to 1000 cc. At 1000 cc, the solution had an arsenic concentration of 18.45 g/liter and 1.92% of the of the original arsenic content had precipitated. When the volume was finally reduced to 250 cc, the solution had an arsenic concentration of 46.66 g/liter, and 50.65% of the initial arsenic content precipitated or crystallized.

By cooling the 250 cc solution to 10° C., a further crystallization was obtained. Filtration separated the crystals. The supernatant liquid amounted to 180 cc of solution, containing 8.575 g/liter arsenic. The mass balance indicated that 91.8% of the initial content of arsenic precipitated or was recovered. The recovered arsenic crystals were collected and analyzed. The analysis indicated that the crystals were of commercial quality, containing 99.9% arsenic, having 0.03% copper, 0.04% iron and 0.13% antimony as impurities.

Example 2

This example demonstrates the recovery of arsenic from the gas-washing effluent of a sulfuric acid plant. The experiment was conducted by heating a solution (1,144 L) obtained from a gas-washing tower of a sulfuric acid plant in sequential stages. The solution contained arsenic (11.602 g/L) and sulfuric acid (49.9 g/L). The solution was heated in sequential stages to a reduced volume of 96.5 liter. The solution was then cooled to 10° C., which caused arsenic trioxide to crystallize. Analysis of the crystals indicated that the crystals contained 97.5% arsenic, which is commercial quality.

Analysis of the supernatant liquid indicated that the solution consisted of 13.07 g/L arsenic and 590 g/liter of sulfuric acid.

The supernatant liquid was then treated with sodium sulfide to further recover arsenic. After the addition of sodium sulfide, the solution contained about 580 g/L sulfuric acid with less than 5 ppm arsenic. Thus, the solution could be used as a weak acid in other processes.

In view of the above, it will be seen that the several objects of the invention are achieved. As various changes could be made in the above material and processes without departing from the scope of the invention, it is intended that all matter contained in the above description be interpreted as illustrative and not in a limiting sense.

What is claimed:

1. A process for recovering arsenic from an aqueous acid solution, the process comprising:

heating said aqueous acid solution in one or more evaporators in series to concentrate said aqueous acid solution and obtain a concentrated acid solution;

preparing a crystallized solution by cooling said concentrated acid solution to crystallize arsenic contained in said concentrated acid solution as arsenic trioxide crystals;

separating the crystallized solution to obtain a solid phase comprising impure arsenic trioxide crystals and a residual liquid phase; and purifying said solid phase to obtain a purified crystal product comprising arsenic trioxide;

wherein said solid phase comprising impure arsenic trioxide crystals is purified by contacting said solid phase comprising impure arsenic trioxide crystals with a lixiviant to remove arsenic trioxide from said solid phase, thereby producing a purified liquid phase comprising arsenic trioxide;

contacting said purified liquid phase with an acid to lower the pH of said purified liquid phase to a value of 10 or below, thereby crystallizing arsenic trioxide to produce a purified solid phase comprising arsenic trioxide in said purified liquid phase; and separating said purified solid phase comprising arsenic trioxide from said purified liquid phase to produce a purified crystal product comprising arsenic trioxide.

2. A process as set forth in claim 1 wherein said aqueous acid solution comprises from about 25 to about 150 g/L of acid.

3. A process as set forth in claim 1 wherein said lixiviant comprises an alkaline metal hydroxide.

4. A process as set forth in claim 1 wherein said purified crystal product comprises at least about 97% arsenic trioxide.

5. A process as set forth in claim 1 wherein said purified crystal product comprises at least about 99% arsenic trioxide.

6. A process as set forth in claim 1 wherein said aqueous acid solution further comprises from about 1 to about 20 g/L of arsenic.

7. A process as set forth in claim 6 wherein said concentrated acid solution comprises from about 5 to about 20 g/L of arsenic and from about 200 to about 640 g/L of acid.

8. A process as set forth in claim 1 wherein wherein said concentrated acid solution is cooled to a temperature of from about 0° C. to about 20° C. to crystallize arsenic trioxide.

9. A process as set forth in claim 1 wherein said concentrated acid solution is cooled by contacting said concentrated acid solution with a liquid having a temperature of from about 0° C. to about 20° C., thereby crystallizing arsenic trioxide.

10. A process as set forth in claim 1 wherein at least about 95% of said arsenic is recovered from said aqueous acid solution.

11. A process as set forth in claim 1 wherein said aqueous acid solution comprises the effluent from a gas wash operation.

12. A process as set forth in claim 11 further comprising filtering said aqueous acid solution before said aqueous acid solution is concentrated.

* * * * *